United States Patent [19]

Probst et al.

[11] Patent Number: 4,659,431
[45] Date of Patent: Apr. 21, 1987

[54] CATIONIC SIZING AGENT FOR PAPER, AND A PROCESS FOR ITS PREPARATION

[75] Inventors: Joachim Probst, Leverkusen; Ulrich Beck, Bornheim; Heinz Bäumgen, Leverkusen, all of Fed. Rep. of Germany

[73] Assignee: Bayer Aktiengesellschaft, Leverkusen, Fed. Rep. of Germany

[21] Appl. No.: 691,991

[22] Filed: Jan. 16, 1985

[30] Foreign Application Priority Data

Jan. 18, 1984 [DE] Fed. Rep. of Germany ....... 3401573

[51] Int. Cl.$^4$ .............................................. D21H 3/38
[52] U.S. Cl. .................................. 162/168.2; 162/158; 162/169; 524/538; 524/829
[58] Field of Search ............... 162/164.6, 168.1, 168.3, 162/168.2, 169, 168.7, 158; 524/538, 829, 460

[56] References Cited

U.S. PATENT DOCUMENTS 4,152,201  5/1979  Killiam ............................ 162/168.2
4,200,562  4/1980  Yoshioka et al. ................ 162/168.7
4,434,269  2/1984  Probst .

FOREIGN PATENT DOCUMENTS 3103917  8/1982  Fed. Rep. of Germany ... 162/164.6

Primary Examiner—Peter Chin
Attorney, Agent, or Firm—Sprung Horn Kramer & Woods

[57] ABSTRACT

New, highly effective cationic sizing agents for paper have been provided. They can be obtained by a method in which a water-soluble cationic chemically pure terpolymer compound consisting of (a) 7–40% by weight of N,N-dimethylaminoethyl acrylate and/or methacrylate,
(b) 40–80% by weight of styrene and
(c) 4–40% by weight of acrylonitrile is dissolved in an aqueous medium, the sum of the components (a) to (c) always being 100% by weight and at least 10% of the N,N-dimethylamino groups of the terpolymer being quaternized and the remainder being protonated, and, in the presence of 10 to 70% by weight, relative to the monomer mixture below, of this emulsifier, (d) 0 to 90% by weight of acrylonitrile and/or methacrylonitrile,
(e) 5 to 95% by weight of styrene and
(f) 5 to 95% by weight of acrylates and/or methacrylates having 1 to 12 C atoms in the alcohol radical, the sum of the components (d) to (f) always being 100% by weight, are emulsified, and the emulsion thus obtained is subjected to free radical-initiated emulsion polymerization at temperatures from 20° to 150° C.

8 Claims, No Drawings

CATIONIC SIZING AGENT FOR PAPER, AND A PROCESS FOR ITS PREPARATION

The present invention relates to aqueous colloidal paper sizing agents based on copolymers of acrylonitrile and/or methacrylonitrile, styrene and acrylates or methacrylates, which are polymerised in the presence of, as emulsifiers, chemically pure, quaternised terpolymers of N,N-dimethylaminoethyl(meth)acrylate, styrene and acrylonitrile.

It has been disclosed (see German Offenlegungsschrift No. 1,621,688) that cationic paper sizing agents can be prepared by mixing an aqueous solution of a polycation, present in salt form and based on maleic anhydride and other comonomers, with an aqueous emulsion homopolymer or emulsion copolymer. However, the mixtures prepared in this manner are in general unstable and tend to deposit sediment which are troublesome in the manufacture of paper, since this can, inter alia, result in inhomogeneous sizing of the paper.

German Offenlegungsschrift No. 2,814,527 describes the preparation of a sizing agent for paper, which has been prepared in the presence of a polymeric cationic emulsifier which is quaternised with an epihalohydrin and consists of an N,N-dimethylaminoalkyl(meth)acrylate and substituted or unsubstituted styrene, if appropriate with the addition of an auxiliary emulsifier of the formula

$$R-O-(CH_2-CH_2-O)_n SO_3^{\ominus} M^{\oplus} \quad (1)$$

wherein
R denotes a higher aliphatic or cycloaliphatic hydrocarbon radical,
$M^{\oplus}$ denotes a monovalent metal cation or ammonium and
n denotes an integer $\geq 2$.

In the presence of these polymeric emulsifiers, hydrophobic monomers, such as styrene, styrene derivatives, acrylates and/or methacrylates are polymerised in an aqueous medium. In a preferred embodiment, a mixture of 23.5% by weight of dimethylaminoethyl methacrylate and 76.5% by weight of styrene in isopropanol is polymerised. Thereafter, the mixture is acidified with acetic acid, and the product is dissolved in water and then quaternised with epichlorohydrin at a temperature of 80° to 85° C. The emulsifiable polycation prepared in this manner is then employed for the aqueous emulsion polymerisation of a mixture of styrene and 2-ethylhexyl acrylate (weight ratio 3:1), the weight ratio of the emulsifier to the monomer mixture being 1:2. A compound (1) in which $M=NH_4$ is employed as an anionic auxiliary dispersant, and aqueous hydrogen peroxide is employed as an initiator. The polymers thus obtained constitute dispersions which are optically cloudy but nevertheless relatively stable. However, if it is desired to reduce the content of basic monomers in the polymeric cationic emulsifier component to 20% by weight or less, the dispersions very rapidly become more coarse-particled and more unstable, and tend to precipitate polymer. The polymer precipitates produced generally result in a substantial deterioration in the sizing effect and lead to breakdowns in the course of operations during paper production.

European Patent Specification No. 0,058,313 describes stable colloidal solutions which are generally translucent and in which acrylonitrile or methacrylonitrile is polymerised with acrylates or methacrylates in the presence of special polymeric cationic emulsifiers in an aqueous system. These emulsifiers are quaternisation products of terpolymers which are chemically very pure, consist of N,N-dimethylaminoethyl(meth)acrylate, styrene and acrylonitrile and contain not more than 40% by weight of basic comonomer. The mean particle diameter of these colloidal solutions is between 15 and 200 nm, preferably between 20 and 150 nm. A disadvantage of these colloidal sizing agents is the fact that their efficiency on special grades of paper, such as, for example, the so-called low-quality papers, is not completely satisfactory. These low-quality papers are grades of old paper which are obtained mainly from waste cardboard and newspaper and once again processed to cardboards. They are generally employed as so-called liners, which have to be treated with starch and cationic surface-sizing agents in order to attain high strength and water-repellant properties.

Surprisingly, it has now been found that stable colloidal paper sizing agents which are extremely effective for low-quality paper are obtained when either mixtures of (meth)acrylonitrile, styrene and acrylates or methacrylates, or mixtures of styrene and acrylates or methacrylates, are polymerised in the presence of the above-mentioned chemically pure quaternised terpolymers.

The paper sizing agent according to the invention is obtained as a colloidal solution having mean particle diameters of 15 to 200 nm, by a method in which a water-soluble cationic chemically pure terpolymer compound consisting of
(a) 7 to 40, preferably 8 to 30, % by weight of N,N-dimethylaminoethyl acrylate and/or methacrylate,
(b) 40 to 80% by weight of styrene and
(c) 40 to 40, preferably 5 to 35, % by weight of acrylonitrile
is dissolved in an aqueous medium, the sum of the components (a) to (c) always being 100% by weight and at least 10% of the N,N-dimethylamino groups of the terpolymer being quaternised and the remainder being protonated, and, in the presence of 10 to 70% by weight, relative to the monomer mixture below, of this emulsifier,
(d) 0 to 90, preferably 0 to 70, % by weight of acrylonitrile and/or methacrylonitrile,
(e) 5 to 95, preferably 10 to 80, % by weight of styrene and
(f) 5 to 95, preferably 10 to 80, % by weight of acrylates and/or methacrylates having 1 to 12 C atoms in the alcohol radical,
the sum of the components (d) to (f) always being 100% by weight, are emulsified, and the emulsion thus obtained is subjected to free radical-initiated emulsion polymerisation at temperatures from 20° to 150° C.

Preferably, the weight ratio of the polymeric cationic emulsifier to the monomer mixture consisting of (d), (e) and (f) is 1:4 to 1:1.

The paper sizing agent according to the invention is also obtained when, in addition to the stated cationic emulsifier, a cationic and/or non-ionic auxiliary emulsifier is employed in amounts of 1 to 40% by weight, preferably 3 to 20% by weight, relative to the above cationic emulsifier, the non-ionic emulsifier being of the formula

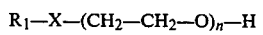

$$R_1-X-(CH_2-CH_2-O)_n-H \quad (II)$$

wherein

X denotes O, NH or COO, $R_1$ is a higher aliphatic, cycloaliphatic, araliphatic or aromatic hydrocarbon radical having 6–30 C atoms, and n is an integer $\geq 2$, and the cationic auxiliary emulsifier being of the formula

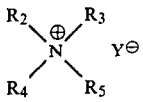  (III)

wherein $R_2$ and $R_3$ represent higher aliphatic or araliphatic hydrocarbon radicals having 6 to 20 C atoms, $R_4$ and $R_5$ represent lower aliphatic hydrocarbon radicals having 1 to 6 C atoms and $Y^\ominus$ represents a halide ion.

The chemically very pure terpolymer of N,N-dimethylaminoethyl(meth)acrylate, styrene and acrylonitrile is quaternised in an organic medium prior to the addition of acids. Acids are then added, and undissolved material dissolves to give aqueous solutions having a concentration of 10 to 30% by weight, preferably 15 to 25% by weight. The emulsifier solutions thus obtained can then be freed from organic solvent by distillation; however, it is not necessary to remove the organic solvent, since the solvent does not in general interfere in the further course of the reaction in the emulsion polymerisation.

For the emulsification procedure, it is sufficient if the quaternised cationic terpolymers are employed for the emulsion polymerisation without further additives. In some cases, however, it is found to be very advantageous if oligomeric non-ionic and/or low molecular weight cationic auxiliary emulsifiers are employed, in proportions of 1 to 40% by weight, preferably 3 to 20% by weight, relative to the cationic emulsifier, together with the polymeric cationic emulsifier.

Suitable non-ionic auxiliary emulsifiers are reaction products of aliphatic, araliphatic, cycloaliphatic or aromatic carboxylic acids, alcohols, phenol derivatives or amines with epoxides, such as, for example, ethylene oxide.

Examples of these are reaction products of ethylene oxide with carboxylic acids, such as, for example, lauric acid, stearic acid, oleic acid, the carboxylic acids of castor oil, abietic acid, with relatively long-chain alcohols, such as oleyl alcohol, lauryl alcohol or stearyl alcohol, with phenol derivatives, such as, for example, substituted benzylphenols, phenylphenols or nonylphenol, and with relatively long-chain amines, such as, for example, dodecylamine and stearylamine. The reaction products with ethylene oxide are oligoethers or polyethers having degrees of polymerisation between 2 and 100, preferably from 5 to 50.

Suitable low molecular weight cationic auxiliary emulsifiers are quaternised ammonium salts, such as, for example, benzyldodecyl-dimethyl-ammonium chloride. The stated auxiliary emulsifiers effect additional emulsification of the monomer mixture and in some cases increase the stability of colloidal sizing agents. However, it is not advisable to use excessively high amounts of these auxiliary dispersants, since in such a case undesired foaming can easily occur.

Acrylates and methacrylates which are preferably employed as comonomers in the free radical emulsion copolymerisation are those compounds which, with the acrylonitrile/styrene or methacrylonitrile/styrene mixtures or with styrene alone, form copolymers having film-formation temperatures of below 100° C.

Copolymers which have higher film-formation temperatures because of the position of their glass transition temperature have an unsatisfactory sizing action. Compounds which are suitable in principle are acrylates, such as methyl, ethyl, n-butyl and 2-ethylhexyl acrylate, and methacrylates, such as methyl methacrylate and n-butyl methacrylate. They can be copolymerised individually or as mixtures with acrylonitrile/styrene, methacrylonitrile styrene or styrene alone. The content of styrene can be between 5 and 95%, preferably 10 to 80% by weight, and that of acrylonitrile or methacrylonitrile can be between 0 and 90% by weight, preferably between 0 and 70% by weight. Because of their tack, formulations containing too small an amount of styrene or (meth)acrylonitrile styrene in the copolymer can be troublesome during paper manufacture; in the case of formulations containing a very large amount of styrene or styrene/(meth)acrylonitrile, sizing of the paper is unsatisfactory.

Preferred initiators for the emulsion polymerisation are water-soluble non-ionic peroxides which donate free radicals, such as hydrogen peroxide and t-butyl hydroperoxide, and water-soluble azo compounds, as described in, for example, German Offenlegungsschrift No. 2,841,045. Other suitable initiators are redox systems which consist of peroxide initiators and reducing agents, such as amines, polyamines, thiourea, iron(II) salts etc. Other suitable initiators are water-insoluble initiators, such as azoisobutyronitrile and benzoyl peroxide. The latter are in solution virtually only in the organic phase. The stated initiators are added in amounts of 0.1 to 5% by weight, preferably 0.3 to 3.0% by weight, relative to the monomer mixture.

The molecular weights of the polymers can be regulated by using customary regulators, for example n-dodecylmercaptan, diisopropyl xanthogen disulphide, thioglycol and thioglycerol. They are added in amounts of 0.1 to 2% by weight, relative to the monomer mixture.

The emulsion polymerisation in an aqueous medium can be carried out by known polymerisation processes, both discontinuously and continuously, or by the feed method. The continuous method and the feed method are particularly preferred. In the latter method, water is initially introduced together with some or all of the emulsifier system and, if appropriate, some of the monomer mixture, under a nitrogen atmosphere, and heated to the polymerisation temperature of 20° to 150° C., preferably 50° to 100° C., and the monomer mixture and the initiator and, if appropriate, the emulsifier are added dropwise in the course of 0.5 to 10 hours, preferably 1 to 6 hours.

After some time, reactivation is effected, and the reaction is completed, the conversion reaching about 99.0% to 99.9% by weight. In this procedure, the weight ratio of emulsifier to polymer is 1:9 to 7:3, preferably 1:4 to 1:1. Residual monomers and any organic solvent still present are removed by distillation in vacuo after the emulsion copolymerisation. Thereafter, water is added until an approx. 10 to 35% strength by weight aqueous colloidal solution results. The viscosity of these dispersions, measured in a rotary viscometer at 20° C., is in general less than 50 mPa.s. The mean particle diameters measured by means of laser scattering spectroscopy, are between 15 and 200 nm, preferably between 20 and 150 nm, depending on the reaction conditions. Dispersions having particle sizes smaller than 50 nm appear transparent, while those having larger particles appear cloudy. Furthermore, the stability of the dispersions having particle sizes smaller than 100 nm is better than that of the dispersions having particle sizes larger than 100 nm, and this can be shown by, for example, exposure to heat at temperatures above 50° C. In the case of relatively coarse-particled dispersions, the amount of sediment is generally substantially greater than in the case of fine-particled dispersions.

If, on the other hand, emulsion polymerisations are carried out according to German Offenlegungsschrift No. 2,814,527, using cationic dispersants in which the content of basic comonomers is not more than 20% by weight, the resulting dispersions are relatively unstable and coarse-particled and have mean particle sizes between 200 and 300 nm.

The stability of the colloidal sizing agents according to the invention is also increased as a result of some of the polymer being grafted onto the polymeric emulsifier, which is present in relatively large amounts. Such grafting reactions, which are initiated by the emulsifier by means of transfer reactions, are known in the literature (see H. Gerrens, Fortschritte der Hochpolymer-Forschung (Advances in high polymer research), Volume I (1959), page 300).

The paper sizing agents according to the invention can be employed by all methods customarily used for surface sizing and engine sizing in paper manufacture.

The advantages over sizing agents according to German Offenlegungsschrift No. 1,621,688, based on a relatively unstable mixture of a cationic latex with a polycation based on styrene and maleic anhydride, are the fact that the sizing action is substantially independent of pH, the low tendency to settle out in the form of sediments, and the low tendency to foam. The very stable transparent, or only slightly cloudy, colloidal solutions of the cationic paper sizing agents according to the invention can be processed without problems, in contrast to the unstable dispersions according to German Offenlegungsschrift No. 1,621,688. They guarantee absolute homogeneity of the sized paper and have a good or outstanding sizing action on virtually all papers, the sizing of aluminium sulphate-free paper being particularly singled out. In this context, the outstanding sizing of chalk-containing paper should be particularly mentioned.

The outstanding sizing of low-quality paper in comparison with the dispersions according to European Patent Specification No. 0,058,313 should be mentioned, as will be illustrated in the examples below.

EXAMPLE 1

Preparation of the cationic emulsifiers 5,720 g of isopropanol are initially introduced into a 40 l stirred autoclave. The autoclave is flushed thoroughly with nitrogen and then heated to 80° C. At this temperature, the mixtures I and the solutions II in Table I are metered in over about 4 hours, in the absence of air. Stirring is then continued for 1 to 2 hours, after which the mixture is reactivated with III. Stirring is then continued for about 6 to 12 hours at 80° C.

When the terpolymerisation is complete, the mixture is cooled to 40° C. or to 50° C., and the amounts of quaternising agents (IV) shown in Table I are metered in. Stirring is continued for 1 to 5 hours at 40° or 50° C., after which the amounts of acetic acid likewise shown in Table I are added. Approx. 63–65 l of deionised water at a temperature of approx. 60° C. are initially introduced into a 120 l stock vessel which is provided with a stirrer, and the contents of the 40 l autoclave are combined with this.

A homogeneous aqueous solution is prepared in a short time by thorough stirring. The aqueous solutions, which still contain organic solvent, possess properties which are also shown in Table I.

TABLE I

| Emulsifier | A | B | C | D |
|---|---|---|---|---|
| Polymerisation temperature (°C.) | 80 | 80 | 80 | 80 |
| Temperature during quaternisation (°C.) | 40 | 40 | 50 | 50 |
| I. N,N—Dimethylaminoethyl methacrylate (g) | 3217 | 2257 | 3217 | 3217 |
| Styrene (g) | 10224 | 10608 | 10224 | 10224 |
| Acrylonitrile (g) | 2644 | 3219 | 2644 | 2644 |
| II. Azoisobytyronitrile (g) | 530 | 600 | 590 | 590 |
| Acetone (g) | 3000 | 3000 | 3000 | 3000 |
| III. Azoisobytyronitrile (g) | 75 | 75 | 70 | 70 |
| Acetone (g) | 300 | 300 | 300 | 300 |
| IV. Epichlorohydrin (g) | 1896 | 1330 | — | — |
| Ethylchloroacetate (g) | — | — | 1887 | — |
| Allyl chloride (g) | — | — | — | 1254 |
| V. Acetic acid (g) | 2630 | 2630 | 2370 | 2370 |
| Concentration (% by weight) | 20.2 | 20.4 | 20.7 | 20.3 |
| Viscosity at 20° C. (mPa.s)+ | 70–100 | 550–820 | 250–350 | 400–550 |
| pH value | 3.5 | 3.7 | 3.0 | 3.2 |
| Conversion, relative to the monomer mixture (% by weight) | 99.5 | 99.7 | 99.6 | 99.8 |
| Appearence of the emulsifier solution | clear | clear | clear | clear |

+the viscosity is not a constant since intrinsic viscosity is present.

EXAMPLES 2 TO 4

400 g of deionised water are initially introduced into a 2 l four-necked flask provided with a stirrer, a reflux condenser and a gas inlet and outlet. The water is then thoroughly boiled under a nitrogen atmosphere, and is cooled to 70° C. Thereafter, the emulsions I (see Table II) are added to the vessel, after which nitrogen is passed over. 0.7 g of a 35% strength hydrogen peroxide solution is then added. After approx. 15–30 minutes, the mixtures II and 8 g of a 35% strength hydrogen peroxide solution which is diluted with 100 g of deionised water are metered in simultaneously in the course of 2 to 3 hours. Stirring is then continued for a further 2 to 5 hours, after which the mixture is reactivated with 1 to 2 g of hydrogen peroxide solution (35%), and polymerisation is continued for approx. 2 to 10 hours. Thereafter, approx. 50 to 150 ml of a mixture of water, organic solvent (isopropanol and acetone) and residual monomers are distilled off in a vacuum from a waterpump, and are replaced by 50 to 150 ml of deionised water. The physicochemical properties of the colloidal solutions thus obtained are likewise shown in Table II.

TABLE II

| Example | | 2 | 3 | 4 |
|---|---|---|---|---|
| I. | Emulsifier A (see Table I) (g) | 500 | 500 | 500 |
| | Styrene (g) | 3.0 | 5.0 | 7.0 |
| | n-Butyl acrylate (g) | 7.0 | 5.0 | 3.0 |
| II. | Styrene (g) | 57.0 | 95.0 | 133.0 |
| | n-Butyl acrylate (g) | 133.0 | 95.0 | 57.0 |
| | Concentration (% by weight) | 25.8 | 25.2 | 25.7 |
| | Viscosity at 20° C. (mPa.s) | <50 | <50 | <50 |
| | pH value | 4.0 | 4.1 | 4.1 |
| | Conversion, relative to the monomer mixture before the distillation (% by weight) | 99.5 | 99.8 | 99.7 |
| | Appearance of the colloidal solution | slightly cloudy | transparent | transparent |
| | Mean particle diameter $d_z$ (nm) | 38 ± 2 | 35 ± 2 | 30 ± 2 |

EXAMPLES 5 AND 6

The colloidal sizing agents 5 and 6 are prepared in the same way as the corresponding sizing agents 3 and 4, except that the emulsifier A is replaced by the emulsifier B (see Table I). As can be seen in Table III, the physicochemical properties of the colloidal solutions are equivalent to those of Examples 2–4.

TABLE III

| Example | | 5 | 6 |
|---|---|---|---|
| I. | Emulsifier B (see Table I) (g) | 500 | 500 |
| | Styrene (g) | 5.0 | 7.0 |
| | n-Butyl acrylate (g) | 5.0 | 3.0 |
| II. | Styrene (g) | 95.0 | 133.0 |
| | n-Butyl acrylate (g) | 95.0 | 57.0 |
| | Concentration (% by weight) | 25.3 | 25.5 |
| | Viscosity at 20° C. (mPa.s) | <50 | <50 |
| | pH value | 4.0 | 4.0 |
| | Conversion, relative to the monomer mixture before the distillation (% by weight) | ~99.8 | ~99.8 |
| | Appearance of the colloidal solution | transparent | slightly cloudy |
| | Mean particle diameter $d_z$ (nm) | 40 | 53 |

EXAMPLES 7 AND 8

The colloidal sizing agents 7 and 8 are prepared in the same way as the sizing agents 2–4, the emulsifier A being retained, but some of the styrene or n-butyl acrylate being replaced by acrylonitrile. Table IV lists the compositions of the monomer mixtures and the physicochemical properties of the colloidal sizing agents.

TABLE IV

| Example | | 7 | 8 |
|---|---|---|---|
| I. | Emulsifier A (see Table I) (g) | 500 | 500 |
| | Acrylonitrile (g) | 2.5 | 3.3 |
| | Styrene (g) | 2.5 | 3.3 |
| | n-Butyl acrylate (g) | 5.0 | 3.3 |
| II. | Acrylonitrile (g) | 47.5 | 63.3 |
| | Styrene (g) | 47.5 | 63.3 |
| | n-Butyl acrylate (g) | 95.0 | 63.3 |
| | pH value | 3.9 | 3.9 |
| | Conversion, relative to the monomer mixture before the distillation (% by weight) | 99.7 | 99.6 |
| | Appearance of the colloidal solution | transparent | transparent |
| | Mean particle diameter $d_z$ (nm) | 53 | 39 |

EXAMPLES 9 AND 10

The colloidal sizing agents 9 and 10 are prepared in the same way as sizing agents 2–4, except that emulsifier A is replaced by the emulsifiers C and D (see Table I), in the amounts indicated in Table V. Table V also lists the physicochemical properties of the paper sizing agents, in addition to the monomer mixtures.

TABLE V

| Example | | 9 | 10 |
|---|---|---|---|
| I. | Emulsifier C (g) | 500 | — |
| | Emulsifier D (g) | — | 500 |
| | Styrene (g) | 5.0 | 5.0 |
| | n-Butyl acrylate (g) | 5.0 | 5.0 |
| II. | Styrene (g) | 95.0 | 95.0 |
| | n-Butyl acrylate (g) | 95.0 | 95.0 |
| | Concentration (% by weight) | 25.7 | 25.5 |
| | Viscosity at 20° C. (mPa.s) | <50 | <50 |
| | pH value | 3.3 | 3.5 |
| | Appearance of the colloidal solution | slightly cloudy | slightly cloudy |
| | Mean particle diameter $d_z$ (nm) | 40 | 38 |

EXAMPLES 11 AND 12 (WITH AUXILIARY EMULSIFIERS)

400 g of deionised water are initially introduced into a 2 l four-necked flask provided with a reflux condenser, a stirrer and a gas inlet and outlet, and are boiled thoroughly under a nitrogen atmosphere. Thereafter, the water is cooled to 70° C., and mixture I (see Table VI) is metered in. After thorough flushing with nitrogen, 0.5 g of a 35% strength by weight hydrogen peroxide solution is added. After a further 15 minutes, the mixtures II and III are metered in uniformly in the course of 2 hours. The mixture is then stirred for 3 hours at 70° C., after which 1 g of hydrogen peroxide solution (35% strength) is added, and stirring is continued for 3 hours. 50 ml of solvent and residual monomers are then distilled off in a vacuum from a waterpump, and are replaced by 50 ml of deionised water. The physicochemical data for the sizing agents are listed in Table VI.

TABLE VI

| Example | | 11 | 12 |
|---|---|---|---|
| I. | Emulsifier A (g) | 500 | 500 |
| | Auxiliary emulsifier E+ (g) | 10 | — |
| | Auxiliary emulsifier F++ (g) | — | 10 |
| | Styrene (g) | 5.0 | 5.0 |
| | n-Butyl acrylate (g) | 5.0 | 5.0 |
| II. | Styrene (g) | 95 | 95 |
| | n-Butyl acrylate (g) | 95 | 95 |
| III. | Hydrogen peroxide (35% strength) (g) | 6.0 | 6.0 |
| | Deionised water (g) | 100 | 100 |
| | Concentration (% by weight) | 25.5 | 25.2 |
| | Viscosity at 20° C. (mPa.s) | <20 | <20 |
| | pH value | 4.1 | 4.2 |
| | Appearance of the colloidal solution | virtually transparent | virtually transparent |
| | Mean particle diameter (nm) | 48 | 42 |

Explanation of Table VI
+Auxiliary emulsifier E: Reaction product of benzylphenylphenol with a polyether which contains hydroxyl groups and is obtained from ethylene oxide.
++Auxiliary emulsifier F: Reaction product of abietic acid with a polyether which contains hydroxyl groups and is obtained from ethylene oxide.

A solution of 5% by weight of starch (Perfectamyl®A4692 from AVEBE) and 0.20 or 0.25% by weight of the sizing agent to be tested (calculated as active substance) in 94.80 or 94.75% by weight of water is used as the sizing liquor for the surface sizing.

Sizing is carried out using a type HF laboratory size press from Werner Mathis, Zurich. In the size press, the sizing liquor is at a temperature of approx. 20° C. The paper is drawn through at a speed of 4 m/minute.

The surface-sized papers are dried on a drying cylinder in the course of approx. 45 sec of approx. 100° C.

Before the sizing test, the papers are conditioned for 2 hours at room temperature. The sizing test is carried out in accordance with DIN 53132. In this test, the water absorption in g/m² after a test time of 60 seconds (Cobb$_{60}$) is determined.

USE EXAMPLE I

This example illustrates the high efficiency of some sizing agents on old paper, so-called low-quality paper I, the composition of which is not defined in any more detail. The comparative substance used is a sizing agent according to European Patent Specification No. 0058313 (sizing agent 2)—referred to here as M.

In the case of low-quality paper I, the pH value in the headbox is approx. 7, the water absorption in the laboratory size press is approx. 60% by weight, and the weight of the paper is 100 g/m².

TABLE VII

| | Surface sizing of low-quality paper I | |
|---|---|---|
| | Cobb$_{60}$ in g/m² when | |
| Sizing agent from Example: | 0.20% by weight | 0.25% by weight |
| | of sizing agent (relative to pure active substance) is added to the liquor: | |
| 3 | 23.9 | 23.3 |
| 5 | 24.5 | 24.0 |
| 7 | 27.5 | 26.7 |
| 9 | 24.2 | 23.7 |
| M | 57.2 | 36.3 |

In the absence of a sizing agent, the water absorption is 137 g/m².

USE EXAMPLE II

This example once again illustrates the high efficiency of a number of sizing agents on low-quality paper II, which has a composition similar to that of low-quality paper I.

The pH value in the headbox is 6.5, the water absorption in the laboratory size press is approx. 50% by weight, and the weight of the paper is 110 g/m².

TABLE VIII

| | Surface sizing of low-quality paper II | |
|---|---|---|
| | Cobb$_{60}$ in g/m² when | |
| Sizing agent from Example: | 0.20% by weight | 0.25% by weight |
| | of sizing agent (relative to pure active substance) is added to the liquor: | |
| 3 | 27.4 | 26.1 |
| 5 | 28.9 | 27.3 |
| 7 | 35.2 | 32.2 |
| 9 | 26.9 | 25.8 |
| M | 48.3 | 39.5 |

In the absence of a sizing agent, the water absorption is 153 g/m².

We claim:

1. A cationic sizing agent for paper, in the form of an aqueous colloidal solution having mean particle diameters of 15 to 200 nm, wherein said sizing agent is obtained by a method in which a water-soluble cationic chemically pure terpolymer emulsifier consisting of
(a) 7–40% by weight of N,N-dimethylaminoethyl acrylate and/or methacrylate,
(b) 40–80% by weight of styrene and
(c) 4–40% by weight of acrylonitrile
is dissolved in an aqueous medium, the sum of the components (a) to (c) always being 100% by weight and at least 10% of the N,N-dimethylamino groups of the terpolymer being quaternized and the remainder being protonated, and, in the presence of 10 to 70% by weight, relative to the monomer mixture below, of this emulsifier,
(d) 0 to 90% by weight of acrylonitrile and/or methacrylonitrile,
(e) 5 to 95% by weight of styrene and
(f) 5 to 95% by weight of an acrylic and/or methacrylic acid ester of a C$_1$–C$_{12}$ alcohol having 1 to 12 C atoms in the alcohol radical,
the sum of the components (d) to (f) always being 100% by weight, are emulsified, and the emulsion thus obtained is subjected to free radical-initiated emulsion polymerization at temperatures from 20° to 150° C.

2. A sizing agent for paper according to claim 1, wherein the cationic chemically pure terpolymer emulsifier consists of
(a) 8–30% by weight of N,N-dimethylaminoethyl acrylate and/or methacrylate,
(b) 40–80% by weight of styrene and
(c) 5–35% by weight of acrylonitrile,
the sum of the components (a) to (c) always being 100% by weight, and the monomer mixture consists of
(d) 0 to 70% by weight of acrylonitrile or methacrylonitrile,
(e) 10 to 80% by weight of styrene and
(f) 10 to 80% by weight of an acrylate and/or methacrylate having 1 to 12 C atoms in the alcohol radical,
the sum of the components (d) to (f) being 100% by weight.

3. A sizing agent for paper according to claim 1, wherein a cationic and/or a non-ionic auxiliary emulsifier is employed in addition to the polymeric cationic emulsifier according to claim 1, in amounts of 1 to 40% by weight, relative to the above cationic emulsifier, the non-ionic emulsifier being of the formula

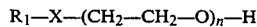

$$R_1-X-(CH_2-CH_2-O)_n-H$$

wherein
X denotes O, NH or COO,
R$_1$ is a higher aliphatic, cycloaliphatic, araliphatic or aromatic hydrocarbon radical having 6–30 C atoms, and
n is an integer $\geq 2$,
and the cationic auxiliary emulsifier being of the formula

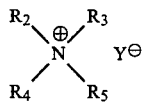

(III)

wherein
R$_2$ and R$_3$ represent higher aliphatic or araliphatic hydrocarbon radicals having 6 to 20 C atoms
R$_4$ and R$_5$ represent lower aliphatic hydrocarbon radicals having 1 to 6 C atoms and
Y$^\ominus$ represents a halide ion.

4. A sizing agent according to claim 1, wherein the weight ratio of the polymeric cationic emulsifier to the monomer mixture of (d) to (f) is 1:4 to 1:1.

5. A sizing agent according to claim 1, wherein the completely polymerised colloidal solution has a mean particle diameter between 20 and 150 nm.

6. A process for the preparation of a cationic sizing agent in the form of an aqueous colloidal solution having mean particle diameters of 15 to 200 nm, wherein a water-soluble cationic chemically pure terpolymer emulsifier consisting of (a) 7–40% by weight of N,N-dimethylaminoethyl acrylate and/or methacrylate,
(b) 40–80% by weight of styrene and
(c) 4–40% by weight of acrylonitrile is dissolved in an aqueous medium, the sum of the components (a) to (c) always being 100% by weight and at least 10% of the N,N-dimethylamine groups of the terpolymer being quaternized and the remainder being protonated, and, in the presence of 10 to 70% by weight, relative to the monomer mixture below, of this emulisfier (d) 0 to 90% by weight of acrylonitrile and/or methacrylonitrile,
(e) 5 to 95% by weight of styrene and
(f) 5 to 95% by weight of an acrylic and/or methacrylic acid ester of a $C_1$–$C_{12}$ alcohol having 1 to 12 C atoms in the alcohol radical, the sum of the components (d) to (f) always being 100% by weight, are emulsified, and the emulsion thus obtained is subjected to free radical-initiated emulsion polymerisation at temperatures from 20° to 150° C.

7. A process according to claim 6, wherein the emulsion polymerization is initiated with a water-soluble non-ionic peroxide and/or an azo compound which donates free radicals in amounts of 0.5 to 5% by weight, relative to the monomer mixture.

8. A process according to claim 7, wherein the polymerization is initiated with a water-soluble non-ionic peroxide and/or an azo compound which donates free radicals as a redox system.

* * * * *